(12) United States Patent
Wu et al.

(10) Patent No.: US 8,693,031 B2
(45) Date of Patent: Apr. 8, 2014

(54) NETWORK SCANNER OVERRIDE OPTIONS IN A DSM ENVIRONMENT

(75) Inventors: Yuwen Wu, Cupertino, CA (US); Yi Ding, Saratoga, CA (US); Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 427 days.

(21) Appl. No.: 12/858,122

(22) Filed: Aug. 17, 2010

(65) Prior Publication Data

US 2012/0044519 A1 Feb. 23, 2012

(51) Int. Cl.
*G06F 3/12* (2006.01)

(52) U.S. Cl.
USPC ............................ 358/1.15; 358/1.13; 358/474

(58) Field of Classification Search
CPC .......... H04N 1/00225; H04N 1/00408; H04N 1/4413
USPC ......................................... 358/1.13, 1.15, 474
See application file for complete search history.

(56) References Cited

U.S. PATENT DOCUMENTS

| 6,577,409 B1 * | 6/2003 | Barker et al. ................. 358/468 |
| 6,661,530 B1 * | 12/2003 | Munetomo et al. ........... 358/1.15 |
| 7,317,545 B2 * | 1/2008 | Tamura .......................... 358/1.13 |
| 7,633,659 B2 * | 12/2009 | Uotani et al. .................. 358/527 |
| 8,078,975 B2 * | 12/2011 | Sprague et al. ............... 715/747 |
| 2006/0262359 A1 | 11/2006 | Lee |
| 2007/0171485 A1 * | 7/2007 | Yachida ......................... 358/474 |
| 2007/0216944 A1 * | 9/2007 | Furuya .......................... 358/1.15 |
| 2009/0031313 A1 * | 1/2009 | Tian .............................. 718/102 |
| 2009/0240697 A1 * | 9/2009 | Fenelon ......................... 707/10 |

OTHER PUBLICATIONS

Fenelon et al.; "Distributed Scan Management," Nov. 6, 2008; XP002664091, Retrieved from Internet: http://download.microsoft.com/download/5/e/6/5e66b27b-988b-4f50-af3a-c2ff1e62180f/cont570_wh08.pptx [Retrieved on Nov. 22, 2011].
Anonymous: "WinHEC 2008 Agenda;" Windows Hardware Engineering Conference 2008, Nov. 5, 2008, Nov. 7, 2008, pp. 1-3, XP002664093, Retrieved from internet, http://download.microsoft.com/download/2/2/8/22881cb83-5eae-4c79-a080-757b71651dcf/WinHEC08_Agenda.xlsx [Retrieved on Nov. 22, 2011].

\* cited by examiner

*Primary Examiner* — Qian Yang
*Assistant Examiner* — Quyen V Ngo
(74) *Attorney, Agent, or Firm* — Duft Bornsen & Fettig LLP (57) ABSTRACT

The systems and method herein provide a design logic that extends Distributed Scan Management (DSM) by integrating the scan setting features of a network scanner with DSM and enhances DSM by providing a means for quickly locating Post Scan Processes (PSP) based on specified search criteria. In this regard, a network scanner is controllable via the PSPs of a DSM protocol. A user interface of the network scanner is operable to receive login information associated with a user that is used to grant access to one or more of the PSPs. The network scanner also includes a storage module operable to store scanner software instructions that direct a processor to determine whether the one or more accessed PSPs have settings that are overrideable and present the one or more accessed PSPs to the user for selection. The user may then override settings of a selected PSP via the user interface.

20 Claims, 10 Drawing Sheets

NETWORK SCANNER OVERRIDE OPTIONS IN A DSM ENVIRONMENT

BACKGROUND

1. Field of the Invention

The invention relates generally to providing Microsoft Distributed Scan Management (DSM) services to networked scanners.

2. Discussion of Related Art

DSM was introduced with the Microsoft Windows Server 2008 R2 release. DSM integrates various devices (e.g., scanners, multi-function printers "MFP", etc.) into a common environment such that system administrators may manage scanning services for large organizations. DSM provides an enterprise with a controlled scan environment for relatively easy enterprise wide scanning.

The DSM environment typically includes a directory service (i.e., Microsoft Active Directory), DSM scanners or MFPs that support Distributed Scan Processing (DSP), a Distributed Scan Device (DSD), and Scan Management Console (SMC). In this regard, network devices may interact with a Distributed Scan Server (DSS) to provide solutions for scanning and post processing of scan data. For example, a DSM scanner implements DSM (DSD and DSP) and interacts with the DSS and SMC to provide scanning in a Microsoft environment. The network devices use DSD and DSP compliant services to communicate with the DSS and the SMC. The DSD specification describes how scanning devices and services operate in a distributed scanning environment and specify the device control model. The DSP specification describes how the scanning devices, services, and post processing of scan data operate in the DSM environment via the administrator created "post scan processes" (PSPs).

PSPs are sets of instructions that are created by the system administrator for acquiring and processing images with a DSM scanner or MFP. Each PSP is identified by a name and includes destination and email information as well as a set of pre-defined scan settings, such as color, scanning resolution (dots per inch or "dpi"), and file format type (e.g., tiff, PDF, etc.). Each PSP also specifies whether scan settings may be overridden.

A problem exists, however, when a user wishes to employ certain types of scans and/or post-scanning processes that are not available via the PSPs. For example, the PSP may be delivered to the user when the user logs in to a particular scanner. That PSP may direct the scanner to scan an image at a certain resolution that the user does not wish to use. Because there is no manner presently available in which to change the settings of the PSP, the user is forced to use that resolution. Accordingly, there is a need to provide a user with the ability to change PSP setting when desired.

SUMMARY

The systems and methods herein provide a design logic that extends DSM by integrating the scan setting features of a network scanner with DSM. It also enhances DSM by providing a means for quickly locating PSPs based on specified search criteria. In one embodiment, a network scanner is operable within a computer network and controllable via the PSPs of a DSM protocol. The PSPs include settings that are used to establish scan acquisition and post scan instructions for the network scanner. The network scanner includes a processor and a network interface that is operable to communicatively couple to the computer network. The network scanner also includes a user interface operable to receive login information associated with a user. The login information is operable to grant access to one or more of the PSPs. The network scanner also includes a storage module that is operable to store scanner software instructions that, when executed by the processor, direct the processor to determine whether the one or more accessed PSPs have settings that are overrideable. The software instructions further direct the processor to present the one or more accessed PSPs to the user for selection via the user interface. The user interface is further operable to receive override information from the user that is used to override at least one setting of the selected PSP.

The storage module may be further operable to store the override information for subsequent use by the user. In this regard, the software instructions may further direct the processor to automatically retrieve the override information upon a subsequent login by the user. The network interface may be further operable to transfer the override information to the computer network for subsequent use by the user. In this regard, the software instructions may further direct the processor to automatically retrieve the override information from the computer network upon a subsequent login by the user. The user interface may be further operable to receive a search parameter from the user and the software instructions may be further operable to direct the processor to locate and retrieve at least one of the PSPs for presentation to the user via the user interface. The search parameter and/or the override information may be a scanned image destination, a resolution, a name, an output file format, a color type for the scanned image, or the like. Those skilled in the art will readily recognize that the above embodiments may also be implemented as functional processes in hardware, software, firmware, or combinations thereof.

Other exemplary embodiments are shown and described below.

BRIEF DESCRIPTION OF THE DRAWINGS

The same reference number represents the same element or same type of element on all drawings.

DETAILED DESCRIPTION OF THE DRAWINGS

FIGS. 1-10 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will also appreciate that the features described below can be combined in various ways to form multiple variations of the present invention. As a result, the invention is not limited to the specific embodiments described below.

Figure 1:
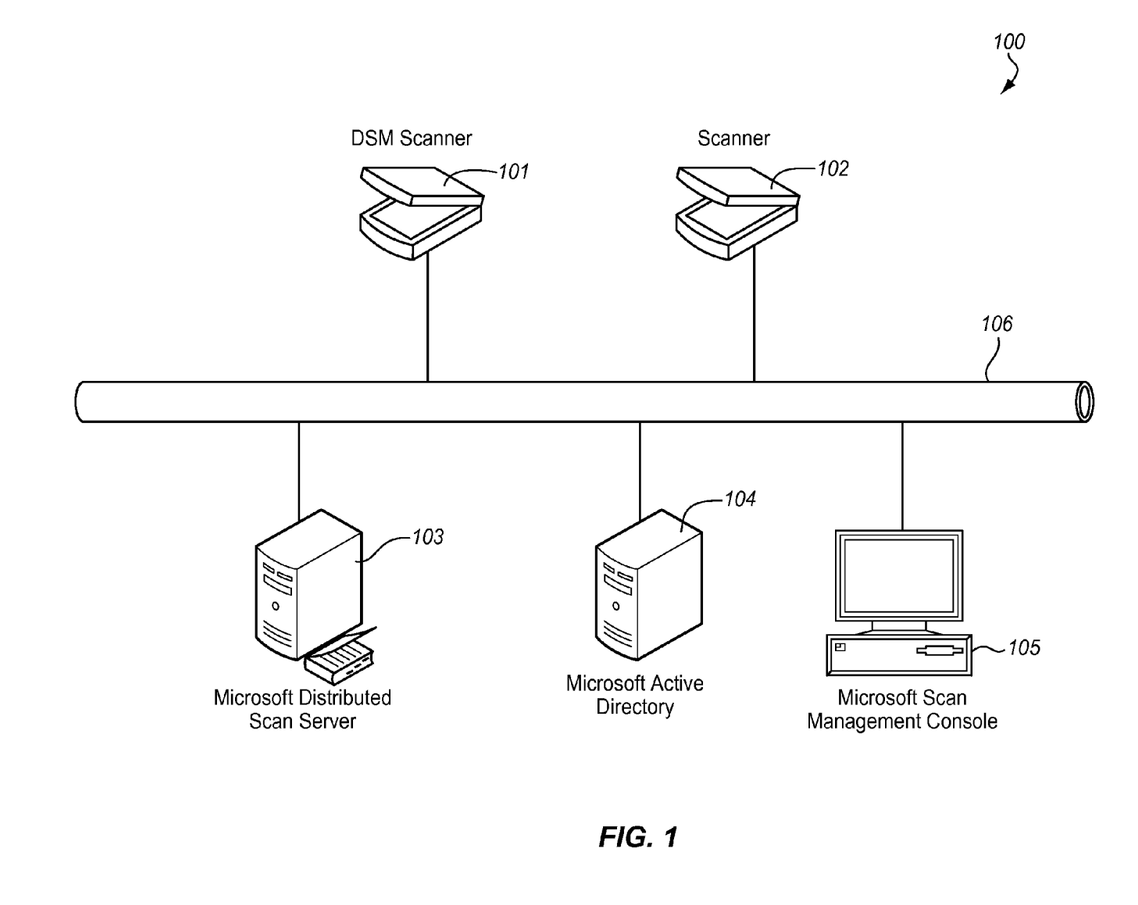
FIG. 1 is a block diagram of an exemplary DSM scanning environment.

FIG. 1 is a block diagram of an exemplary DSM scanning environment 100. The DSM scanning environment 100 includes a DSM network scanner 101, a network scanner 102 (not necessarily a DSM scanner), a Microsoft DSS 103, a Microsoft Active Directory 104, and a Microsoft SMC 105, each of which is operable within the computer network 106. The Microsoft DSS 103 provides a central/secure point of scan processing for the computer network 106. The Microsoft DSS 103 is any device capable of centralizing management of user logins for scanning across an enterprise, integrating scan functionality into Enterprise Content Management (ECM) solutions, and providing file sharing capabilities for scanned files (e.g., network shared folders, Microsoft SharePoint, email, Optical Character Recognition (OCR) processing, etc.). While the Microsoft DSS 103 does not manage user account or provide file sharing mechanisms, it processes, stores and/or routes scanned image files to scan destinations. The SMC 105 is any device capable of managing devices (e.g., the scanners 101 and 102) in the computer network 106, retrieving configurations and current statuses of the devices in the network 106, and allowing an administrator to create scan processes (i.e., PSPs) on a per user basis. The PSPs can also be created at group level. The Active Directory 104 is any device capable of allowing users to retrieve PSPs from a device in the computer network 106 and control the user's scanning activity in the computer network 106. The Active Directory 104 also allows users to store PSPs but generally does not control a user's scanning activity. In this embodiment, the network DSM scanner 101 is operable to provide users with the ability to create and store final scan settings and/or override settings of PSPs retrieved from the Active Directory 104.

Figure 2:
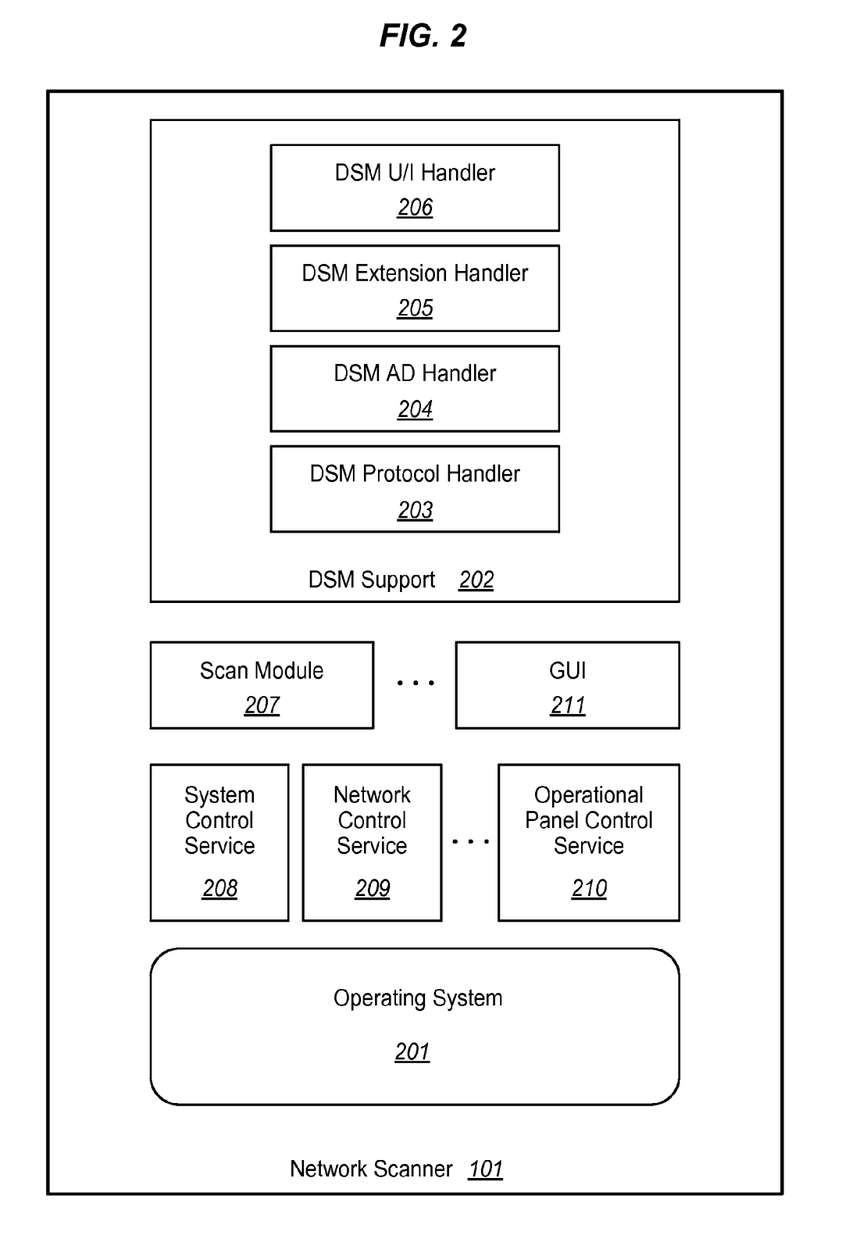
FIG. 2 is a block diagram of an exemplary DSM network scanner.

FIG. 2 is a block diagram of the DSM network scanner 101. The DSM network scanner 101 includes a variety of modules that are typical to other network scanners. For example, the DSM network scanner 101 includes an operating system that controls hardware, firmware, and software components of the DSM network scanner 101. Such components include the physical scan module 207, a graphical user interface (GUI) 211, the system control service module 208, the network control service module 209, and the operational panel control service module 210.

The DSM network scanner 101 provides a user access to scanning processes (e.g., PSPs) via a login or a smart card. For example, the DSM network scanner 101 may authenticate a user when the user swipes a smart card containing user authentication information. The DSM network scanner 101 authenticates the user and retrieves available PSPs from the Active Directory 104 that are associated with that user. The user may then select a PSP and override job scan settings of the retrieved PSP in a variety of ways. For example, if the PSP has a pre-defined setting that is not supported by the DSM network scanner 101, then the DSM network scanner 101 may use default scan settings for application to a scan job. Alternatively, the user may generate scan settings that override certain settings of the selected PSP. If the settings of the PSP cannot be overridden, the DSM network scanner 101 may deliver an invalid PSP error and preclude the user from scanning via the selected PSP. In such a case, the DSM network scanner 101 may allow the user to generate scan settings and store those settings (e.g., within the DSM network scanner 101 and/or the Active Directory 104) for subsequent use. In storing these settings, the user may name the settings so that it may be readily identifiable for subsequent use, comparable to the naming conventions of PSPs.

To assist in these override features, the DSM network scanner 101 also includes a DSM support module 202 that provides the network scanner 101 with the ability to operate in the DSM environment. The DSM support module 202 includes a plurality of DSM modules, such as a DSM user interface handler 206, a DSM extension handler 205, a DSM Active Directory handler 204, and a DSM protocol handler 203. The DSM protocol handler 203 is generally operable to process Web Service Descriptor Language (WSDL) DSD requests from clients, composes DSP WSDL request messages, and communicate with the Distributed Scan Server 103. The DSM protocol handler 203 also generates scanner and job related events and sends notifications to subscribers.

The DSM Active Directory handler 204 includes information pertaining to the PSP schema defined in the Active Directory 104. The DSM Active Directory handler 204 implements a Lightweight Directory Access Protocol (LDAP) to retrieve PSPs from the Active Directory 104 and interpret retrieved PSP data (e.g., scan settings). The DSM Active Directory handler 204 may also store retrieved PSP data for efficiency during subsequent use. The DSM Active Directory handler 204 may also search for PSPs, once retrieved, based on user specified criteria such as scan settings, destinations, whether the PSPs allow additional email addresses, etc. The DSM user interface handler 206 controls the GUI 211 of the network scanner 101 and communicates with the other DSM components. For example, the DSM user interface handler 206 may receive user provided override information that overrides a retrieved PSP. The DSM user interface handler 206 may transfer this information to the DSM protocol handler 203 to determine whether the PSP may be overridden. The DSM extension handler 205 handles DSM extended features, such as override settings and destination searches. Additional details regarding the DSM extension handler 205 are shown and described below. Each of the modules of the network scanner 101 may be implemented as software, hardware, firmware, or combinations thereof. Accordingly, the various modules of the DSM network scanner 101 should not be limited to any particular implementation as such may be a matter of design choice.

Figure 3:
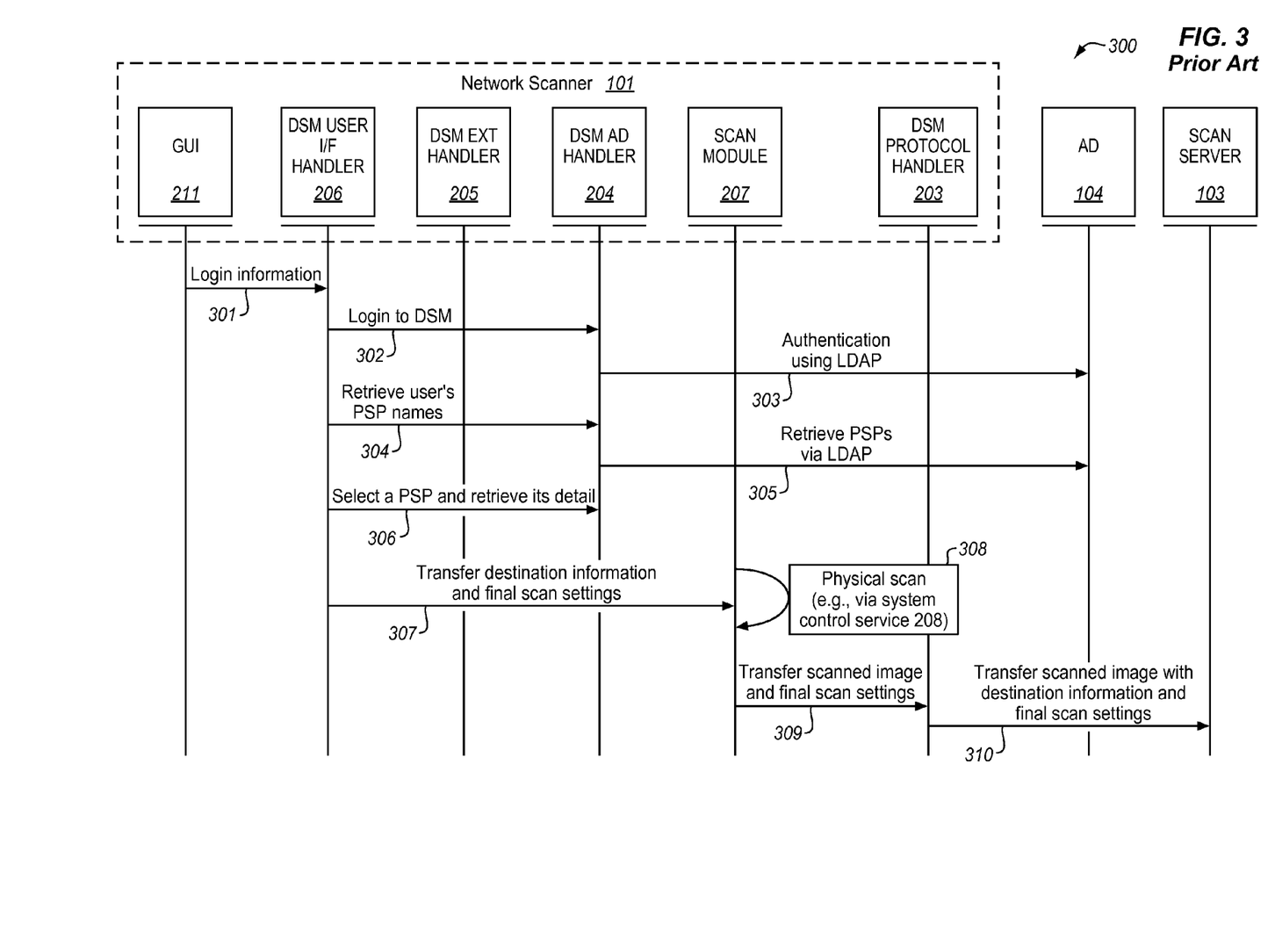
FIGS. 3-5 are exemplary sequence diagrams illustrating the operation of the DSM network scanner in a DSM environment.
Figure 4:
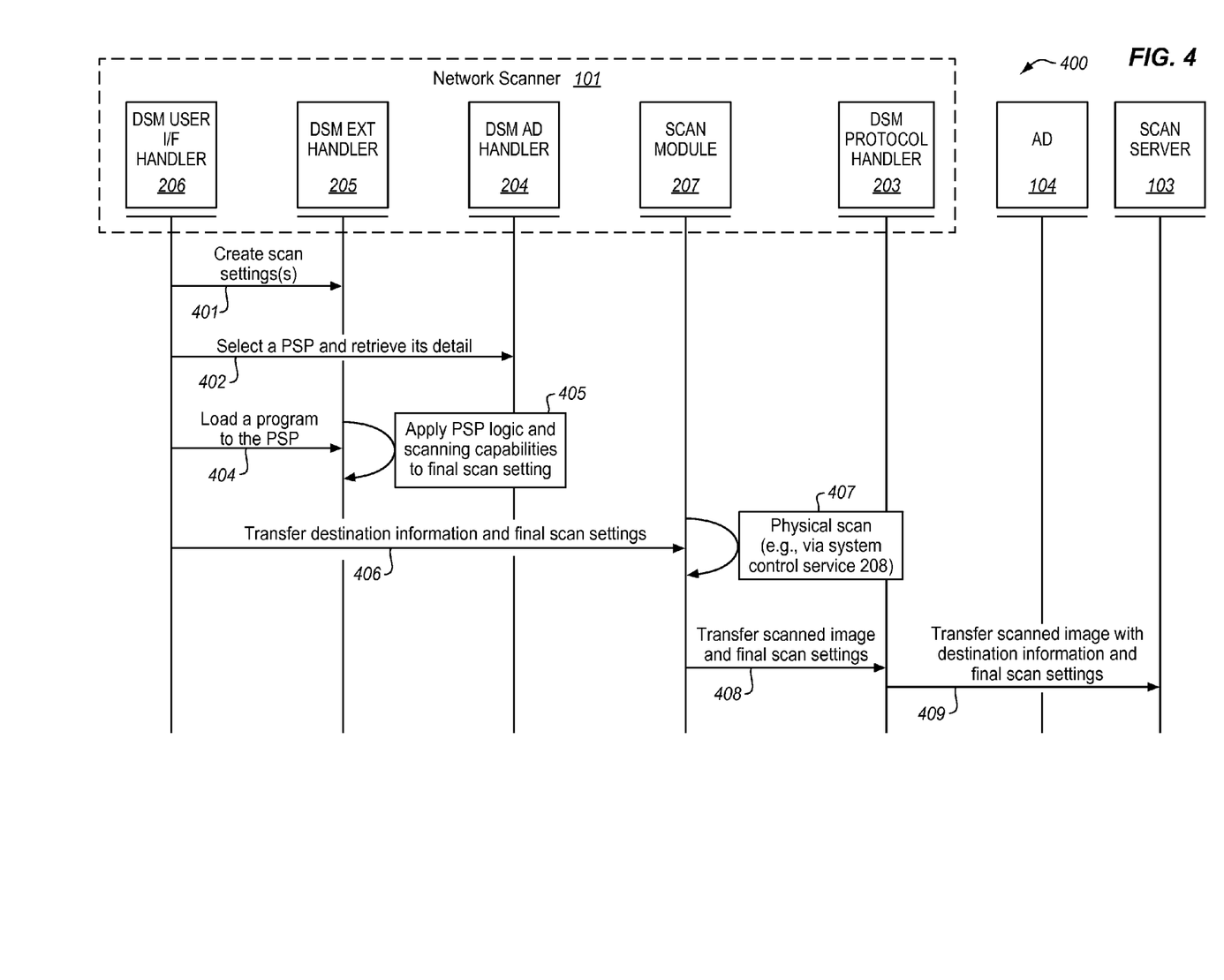
Figure 5:
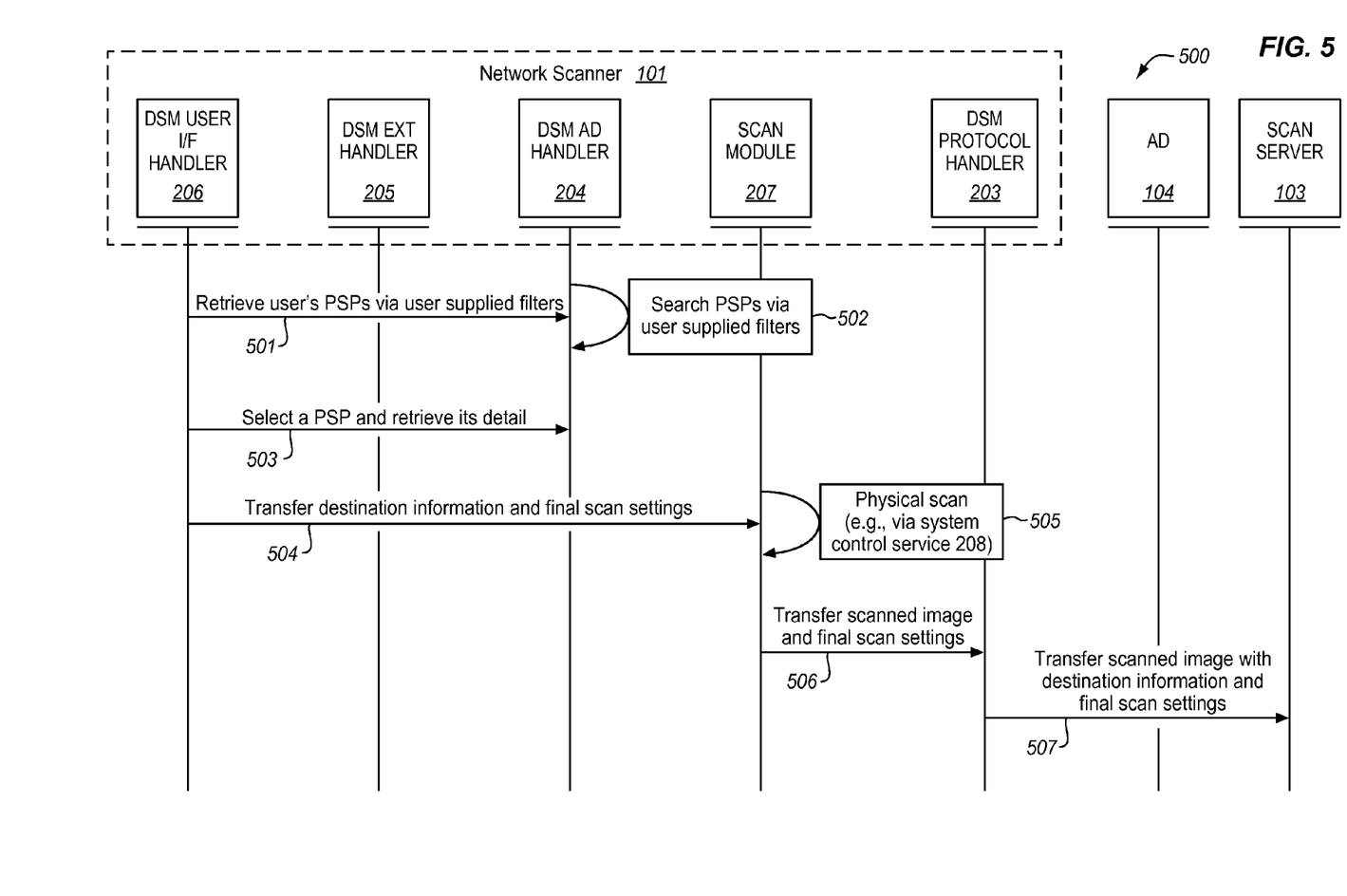

FIGS. 3-5 are sequence diagrams illustrating the operation of the network scanner 101 in the DSM environment. FIG. 3 illustrates the prior art operation 300 of using a PSP from the Active Directory 104. FIG. 4 illustrates an exemplary operation 400 wherein a retrieved PSP has settings that are overridden. FIG. 5 illustrates an exemplary operation 500 wherein a user may search for a PSP for use in a scan job. Turning now to FIG. 3, the operation 300 initiates when the user logs into the GUI 211 of the network scanner 101. The GUI 211 transfers the information to the DSM user interface handler 206, in the sequence 301, which in turn transfers the login information to the DSM Active Directory handler 204, in the sequence 302. The DSM Active Directory handler 204 transfers the user's login information for authentication by the Active Directory 104, in the sequence 303. Such may include the DSM Active Directory handler 204 configuring the authentication information via LDAP.

Once authenticated, the DSM user interface handler 206 retrieves the names of the PSPs associated with the user from the DSM Active Directory handler 204, in the sequence 304. For example, the DSM Active Directory handler 204 may determine the PSP names associated with the user's login information such that those PSPs may be presented to the user via the GUI 211 by way of the DSM user interface handler 206. The DSM Active Directory handler 204 generally fetches the user associated PSPs from the Active Directory 104. However, the DSM Active Directory handler 204 may cache PSPs and periodically sync them such that PSP retrieval from the Active Directory 104 is not necessary.

Based on the authentication information and the PSP names, the DSM Active Directory handler 204 may retrieve the PSPs associated with the user from the Active Directory 104, in the sequence 305. For example, the Active Directory 104 may transfer the user associated PSPs to the DSM Active Directory handler 204 via LDAP as requested by the DSM Active Directory handler 204.

With the associated PSPs being ready for operation within the DSM Active Directory handler 204, the user may select one of the associated PSPs and retrieve its detail from the DSM Active Directory handler 204, in the sequence 306. Once a particular PSP is selected by the user via the GUI 211, the DSM user interface handler 206 may retrieve information/settings pertaining to the selected PSP from the DSM Active Directory handler 204. The DSM user interface handler 206 may present the information/settings of the selected PSP to the user via the GUI 211 such that the user is aware of the scanning procedures to be used. The user may then initiate scanning by sending the PSP scanning details to the scanning module 207 of the network scanner 101, in the sequence 307. For example, the DSM user interface handler 206 may transfer the scan settings of the PSP to the system control service 208 to perform a physical scan via the scan module 207, in the sequence 308. The scan module 207 may, in turn, transfer the scanned image and the final scan settings to the DSM protocol handler 203, in the sequence 309, such that the DSM protocol handler 203 may determine where the scanned image is to be delivered. For example, the user may wish to send the scanned image to an e-mail account and/or share the scanned image via some other means (e.g., Sharepoint). In this regard, the DSM protocol handler 203 may send the scanned image to the scan server 103 along with the destination information and scan settings such that the scan server 103 may transfer the scanned image accordingly, in the sequence 310.

In the operation 400 of FIG. 4, it is assumed that the user has already logged in and that the user has been authenticated by the DSM Active Directory handler 204, as illustrated in FIG. 3. It is also assumed that the PSPs associated with the authenticated user have been retrieved and presented to the user via the GUI 211. In this embodiment, the user creates scan settings that are used to process a scan job for the network scanner 101, in the sequence 401. These settings may include information and details regarding the processes to be involved in scanning (e.g., resolution in dpi, image size, destination, file format, etc.), similar to that information in the PSPs. The user may choose to use these settings later so the user may save these settings as a "program" that may be loaded for later scan jobs. Afterwards, the authenticated user may select a presented PSP that is associated with the user's login such that the DSM user interface handler 206 may retrieve that PSP and its detail from the DSM Active Directory handler 204, in the sequence 402, as similarly presented in the sequence 306 of FIG. 3. With the PSP retrieved, the DSM user interface handler 206 may load the scan settings into the PSP if the selected PSP has features that may be overridden. For example, the selected PSP may have a preset resolution of 300 dpi. The user, however, may wish to scan at a higher resolution such as 600 dpi to improve image quality. Accordingly, the user may create scan settings that include a resolution of 600 dpi to override the selected PSP resolution. If the preset resolution of the selected PSP may be overridden, the DSM extension handler 205 applies the scan settings (e.g., the program) to the selected PSP and forces the network scanner 101 to honor the logic and scanning capabilities of the final scan settings, in the sequence 404. From there, the DSM user interface handler 206 transfers the destination and final scan settings to the scan module 207, in the sequence 406, to perform a physical scan, in the sequence 407. The scan module 207 then transfers the scanned image and final scan settings to the DSM protocol handler 203, in the sequence 408, which, in turn, transfers the scanned image with the destination scan settings to the scan server 103, in the sequence 409, as the similarly performed in the sequences 309 and 310 of FIG. 3.

Although shown and described with respect to a single PSP setting being overridden (e.g., the dpi), the invention is not intended to be so limited. For example, the PSP may include a plurality of scan settings that may be overridden including resolution, destination, image color (e.g., black and white), single page or multipage tiff, single page or multipage PDF, etc. In some instances, the PSP includes scan settings that may not be overridden as determined by the administrator who defines the PSP. In such a case, when the DSM extension handler 205 applies the user generated scan settings to the PSP, the scan settings that may not be overridden remain as those established in the PSP such that scanning proceeds with those non-overrideable features. In other instances, the selected PSP may include scan settings that are not compatible with the network scanner 101. If such occurs, the scan settings established by the user may be used as the settings to implement scanning and completely ignore the features of the selected PSP. Alternatively, the non compatible scan settings may be overridden. This information may be subsequently transferred to the Active Directory 104 along with its destination settings such that the scan server 103 may properly deliver the scanned image.

In one embodiment, the user stores the user created scan settings for subsequent use in scanning For example, the user may retrieve a PSP with features that may be overridden by user created scan settings. Once the features of the user created scan settings are applied to the PSP, those settings may be stored with the same or another name such that the user may select those settings at a later date for scanning In this regard, the DSM Active Directory handler 204 may store the edited PSP with the network scanner 101. Alternatively, the user may simply store the user generated scan settings using a naming convention similar to the PSPs. For example, the user created scan settings may be stored with the network scanner 101 and/or the Active Directory 104 in an instance where the selected PSP includes features that are not overrideable yet the user wishes to save the features of the user created scan settings for subsequent use. In any case, the user may search for a particular PSP or saved scan settings via the GUI 211 for subsequent scanning Thus, in the operation 500 of FIG. 5, the user searches scan settings and/or scan destinations based on desired criteria and then selects the PSP that matches the criteria for the scan job.

Again, it is assumed that the user has already logged in and that the user has been authenticated by the DSM Active Directory handler 204. However, the PSPs associated with the authenticated user have been retrieved and presented to the user via the GUI 211 after the user performs a search for such PSPs. For example, the user may input certain parameters through the GUI 211 to filter the PSPs for selection. In this regard, the DSM user interface handler 206 may transfer the filter parameters to the DSM Active Directory handler 204, in the sequence 501. In this regard, the DSM Active Directory handler 204 may search for the PSPs via the user supplied filters to retrieve the desired PSPs for the user, in the sequence 502. These filter parameters may be configured in a variety of ways. For example, the user may desire PSPs that are presented via the GUI 211 and the DSM user interface handler 206 by name in alphabetical order. Another example may include searching for PSPs that are operable to transfer scanned images to a particular destination and/or scan images in a particular resolution. Accordingly, the invention is not intended to be limited to any particular filter parameter.

Once the retrieved PSPs are presented to the user, the user may select a PSP. The DSM user interface handler 206 retrieves the selected PSP and its associated details pertaining to scanning from the DSM Active Directory handler 204, in the sequence 503. The DSM user interface handler 206 may then transfer the destination information and final scan settings to the scan module 207, in the sequence 504, such that the scan module 207 may perform a physical scan, in the sequence 505. The scan module 207 may then transfer the scanned image and PSP information to the DSM protocol handler 203, in the sequence 506. The DSM protocol handler 203, in turn, transfers the scanned image with the destination information and scan settings to the scan server 103, in the sequence 507, such that the scan server 103 may deliver the scanned image according to be destination information of the PSP.

Figure 6:
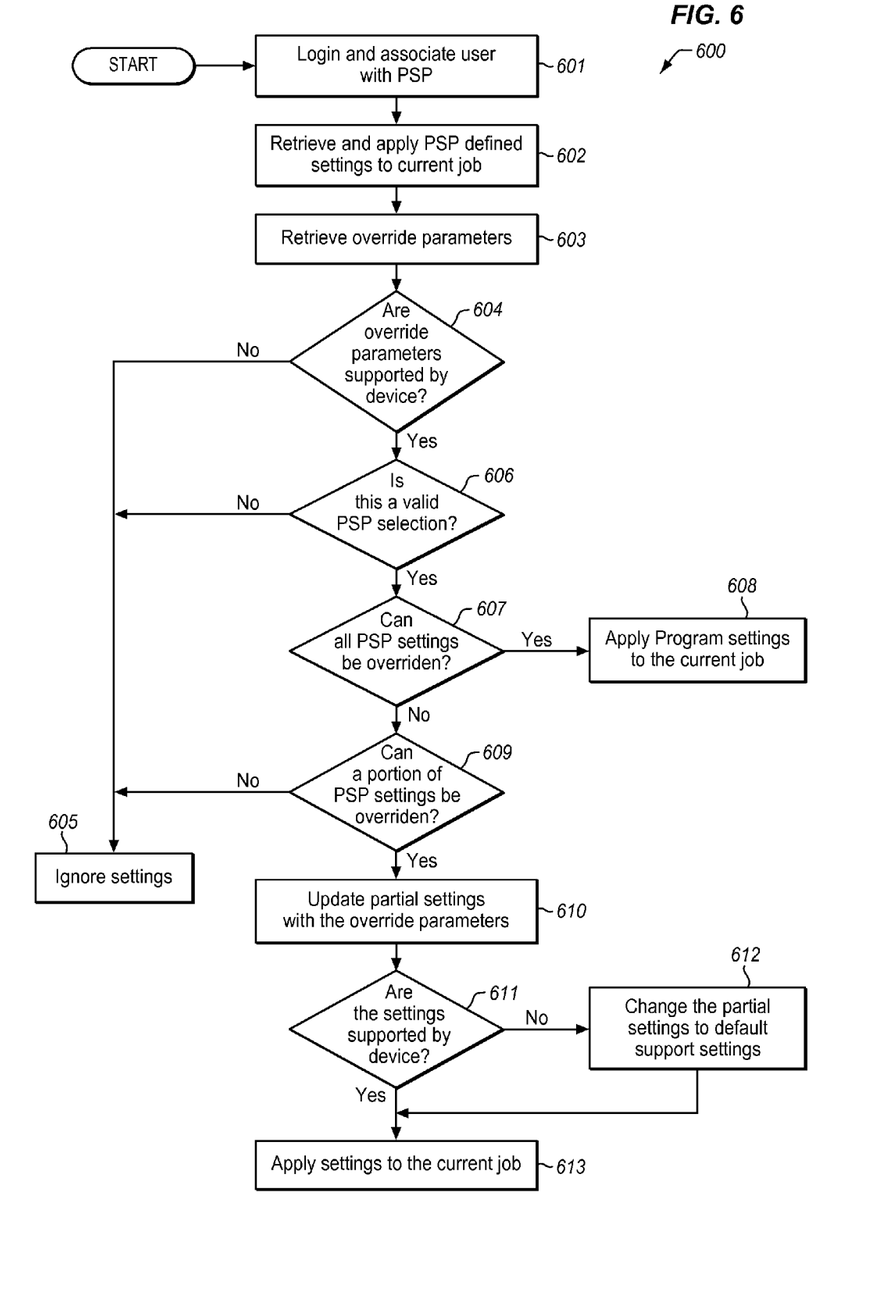
FIG. 6 is a flowchart illustrating an exemplary process of overriding a PSP via the DSM network scanner.

FIG. 6 is a flowchart illustrating an exemplary process of overriding a PSP via the network scanner 101. As illustrated in the sequence diagrams above, the process generally starts when a user logs in via the GUI 211 at which time the DSM user interface handler 206 processes the login information to authenticate the user and associate a particular set of PSPs with the user, in the process element 601. The network scanner 101 then retrieves the set of PSPs from the Active Directory 104 (i.e., via the DSM Active Directory handler 204) for presentation to the user through the GUI 211 (i.e., via the DSM user interface handler 206), in the process element 602. Once the user selects a particular PSP from the group, the settings of the PSP may be applied to a current scan job. Should the user desire to enter other scan and/or destination settings, the user may enter those through the GUI 211. For example, the user may create scan settings that contain information used to override certain scan and/or destination settings in the selected PSP. The DSM user interface handler 206 retrieves these override settings, in the process element 603, and transfers the override settings to the DSM extension handler 205 to determine if settings within the selected PSP may be overridden.

Once the DSM extension handler 205 receives the override settings, the DSM extension handler 205 may determine if the network scanner 101 is capable of supporting the override settings, in the process element 604. If the network scanner 101 is not capable of supporting the override settings, the DSM extension handler 205 ignores the settings, in the process element 605, and applies the present settings of the selected PSP to the scan job. However, if the override settings are supported by the network scanner 101, the DSM extension handler 205 may determine if the PSP itself is a valid selection, in the process element 606. For example, the DSM extension handler 205 may determine whether the settings of the PSP are supported by the network scanner 101. If not, the DSM extension handler 205 may direct the network scanner 101 to apply default settings to the scan job such that scanning may proceed. If the PSP is valid (e.g., if the PSP is operable as is with the network scanner 101), then the DSM extension handler 205 determines whether all of the PSP settings may be overridden, in the process element 607. If so, the DSM extension handler 205 applies the user created scan settings to the selected PSP, in the process element 608, to initiate the scan job. For example, if the scan settings defined in PSP can be overridden, the scan settings may be applied to current scan settings. Thus, if the user selects a PSP having settings of color, 200 dpi and single-tiff, and the user applies scan settings of color, 400 dpi, and multi-page PDF, then the scan settings applied to the job are color, 400 dpi, and multi-page PDF.

If certain settings within the PSP may not be overridden, the DSM extension handler 205 may determine whether a portion of the PSP settings may be overridden, in the process element 609. If not, the DSM extension handler 205 ignores the user created scan settings, in the process element 605, and applies those settings of the selected PSP to the scan job. Thus, if the user selects a PSP having settings of color, 200 dpi, and single-tiff, and the user applies settings of color, 400 dpi, and multi-page PDF, then the scan settings applied to the job are the settings specified in the PSP (i.e., color, 200 dpi and single-tiff).

If a portion of the PSP settings may be overridden, then the DSM extension handler 205 applies the settings of the user generated scan settings to the selected PSP to override those portions of the PSP that may be overridden, in the process element 610. For example, if a portion of the scan settings can be overridden (e.g. resolution and file format can be overridden while color is not allowed) as defined in the selected PSP, the user generated scan settings may be applied based on not only the overridden attribute but also the capabilities of the network scanner 101. The user generated scan settings may not override a PSP scan setting if the combination of PSP scan settings and user generated scan settings are not supported by the network scanner 101. Thus, if the user selects a PSP having settings of color, 200 dpi, and single-Tiff (wherein color cannot be overridden while resolution and file format can be overridden) and the recalled settings of black/white, 600 dpi, and multi-page compressed Tiff, then the final scan settings applied to the job are color, 600 dpi, and multi-page PDF. Color is not overridden because it is not allowed and, since the network scanner 101 does not support compressed multi-page color Tiff, the network scanner 101 uses its default multi-page PDF instead of multi-page tiff for the file format. It should be noted, however, that the established settings are merely examples and may vary from network scanner to network scanner.

Accordingly, before initiating scanning, the DSM extension handler 205 may determine whether the updated PSP comprises a combination of settings that is supported by the network scanner 101, in the process element 611. If not, the DSM extension handler 205 may change one or more of the settings in the PSP to default settings of the network scanner 101 such that scanning may proceed uninhibited, in the process element 612. Otherwise, the use generated settings are applied to the current scan job, in the process 613, and scanning commences with the scan module 207.

Figure 7:
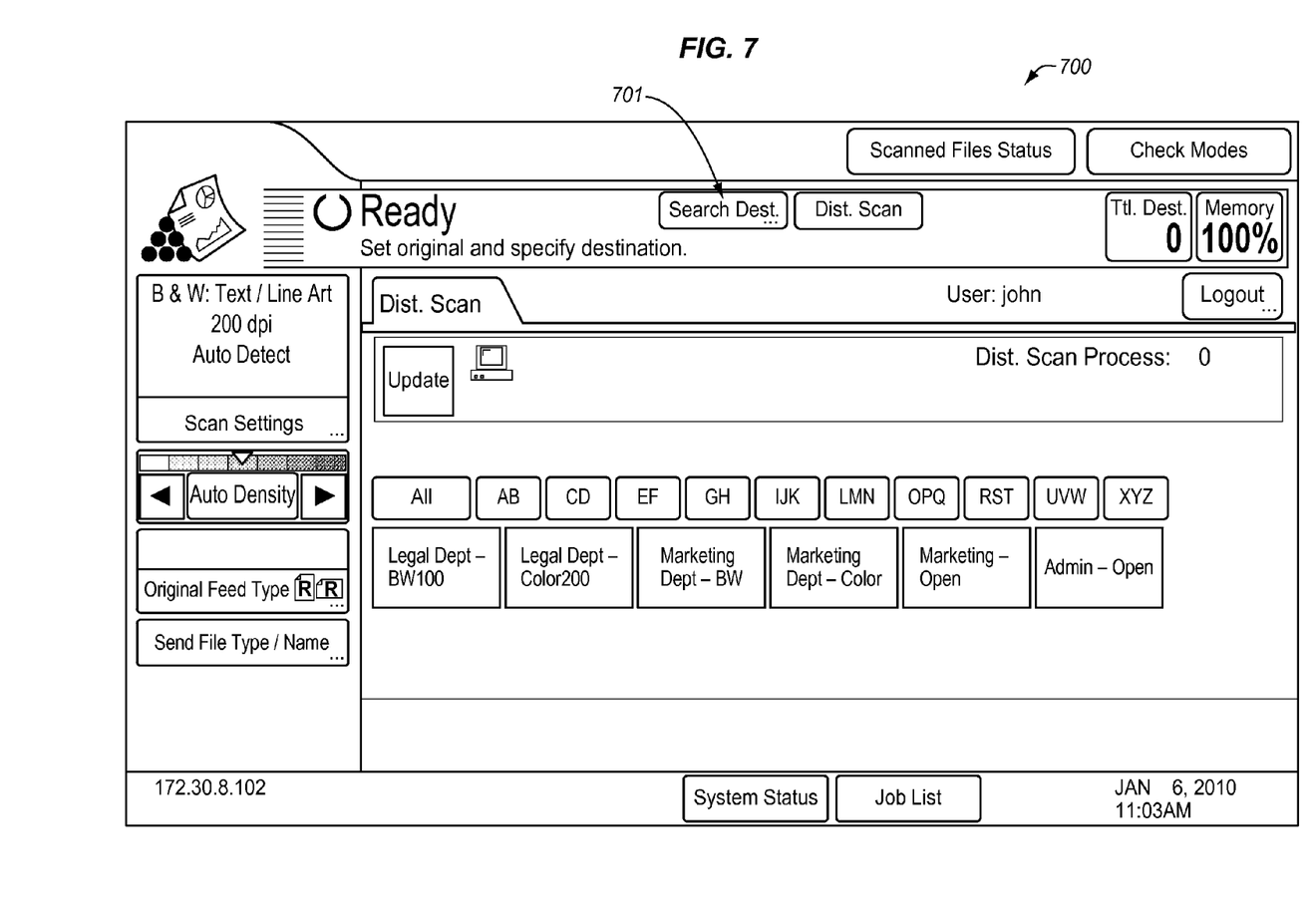
FIGS. 7-9 are exemplary screenshots of a graphical user interface that assist the user with PSP interaction.
Figure 8:
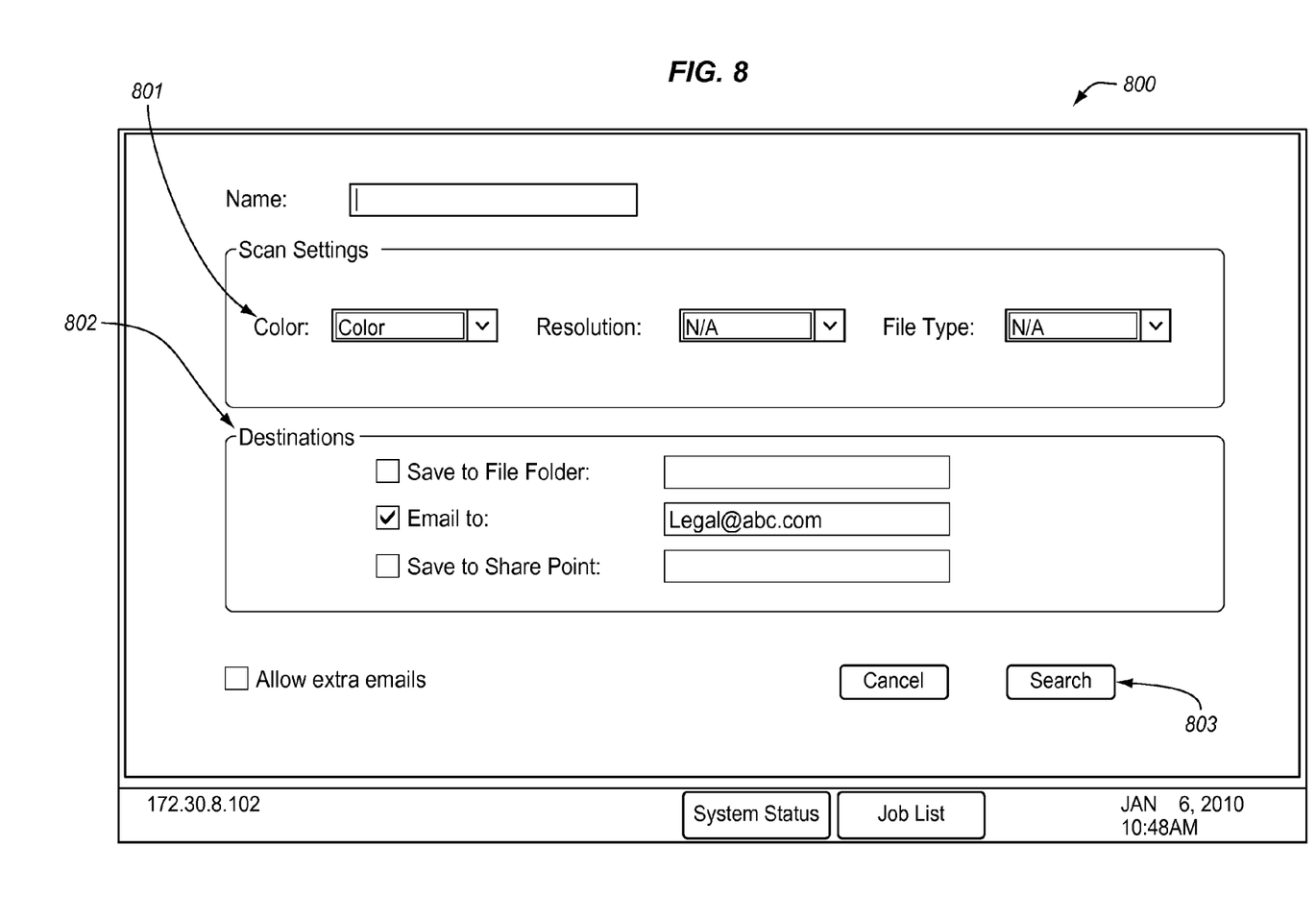
Figure 9:
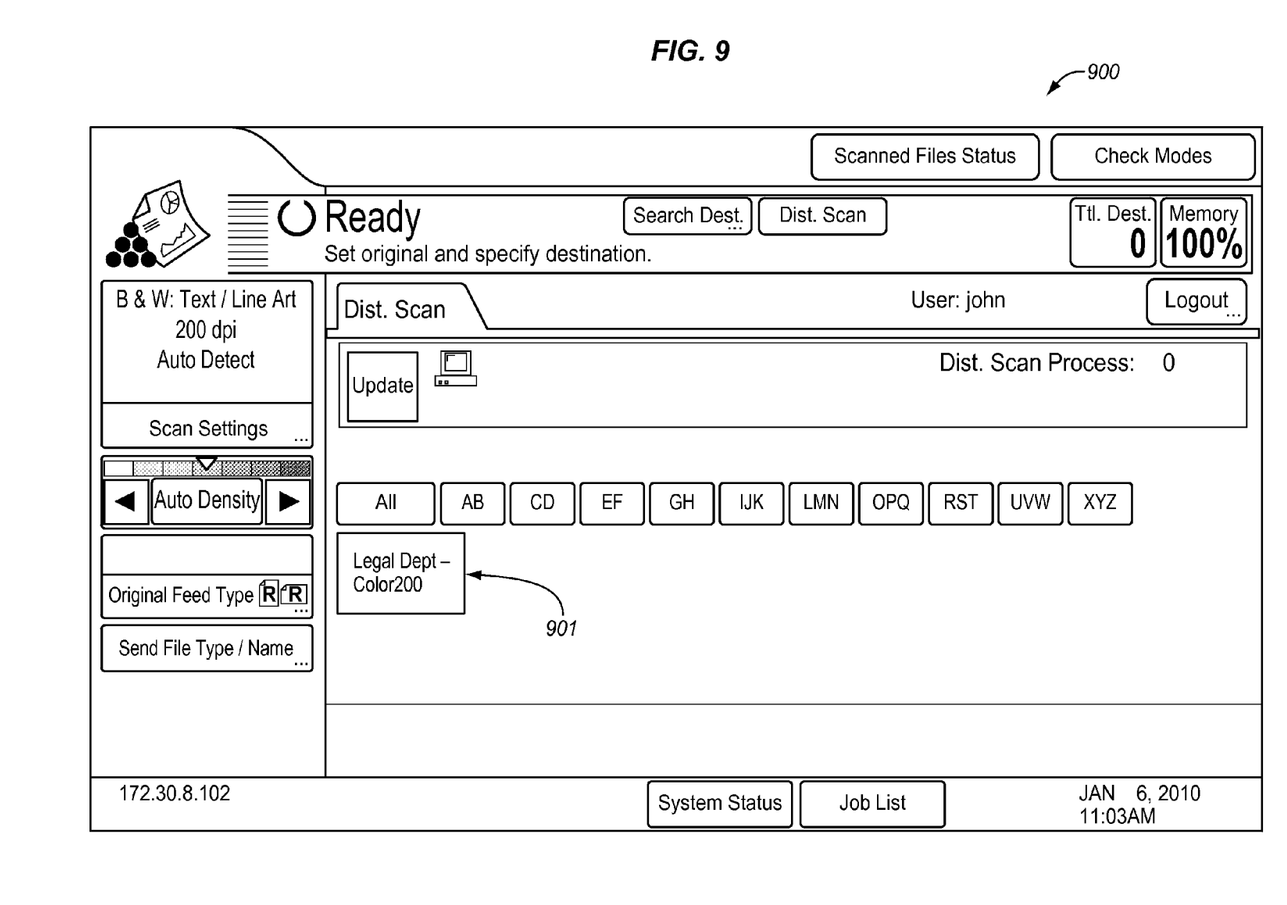

FIGS. 7-9 are exemplary screenshots 700, 800, and 900, of the GUI 211 that assist the user with PSP interaction. For example, a user may search for PSPs that have pre-defined color settings of "Color" and document destination settings of "email to Legal@abc.com". The user may then select the "Search Dest." button 701 of FIG. 7 of the screenshot 700 to bring up search window of the screenshot 800 of FIG. 8. In the search window of the screenshot 800, the user enters the search criteria of "Color" in the color setting 801 and "email to Legal@abc.com" in the document destination setting 802. Then the user selects the "Search" button 803 to retrieve PSPs meeting those search criteria. Once the DSM Active Directory handler 204 locates those PSPs, they are presented to the user via the GUI 211, as illustrated in the screenshot 900 of FIG. 9. In this example, the DSM Active Directory handler 204 located a PSP entitled "LegalDept-Color200" that has the above two mentioned search criteria under the PSP selection area 901. With this PSP presented, the user may simply select the LegalDept-Color200 PSP to initiate a scan job with the settings of that PSP.

Figure 10:
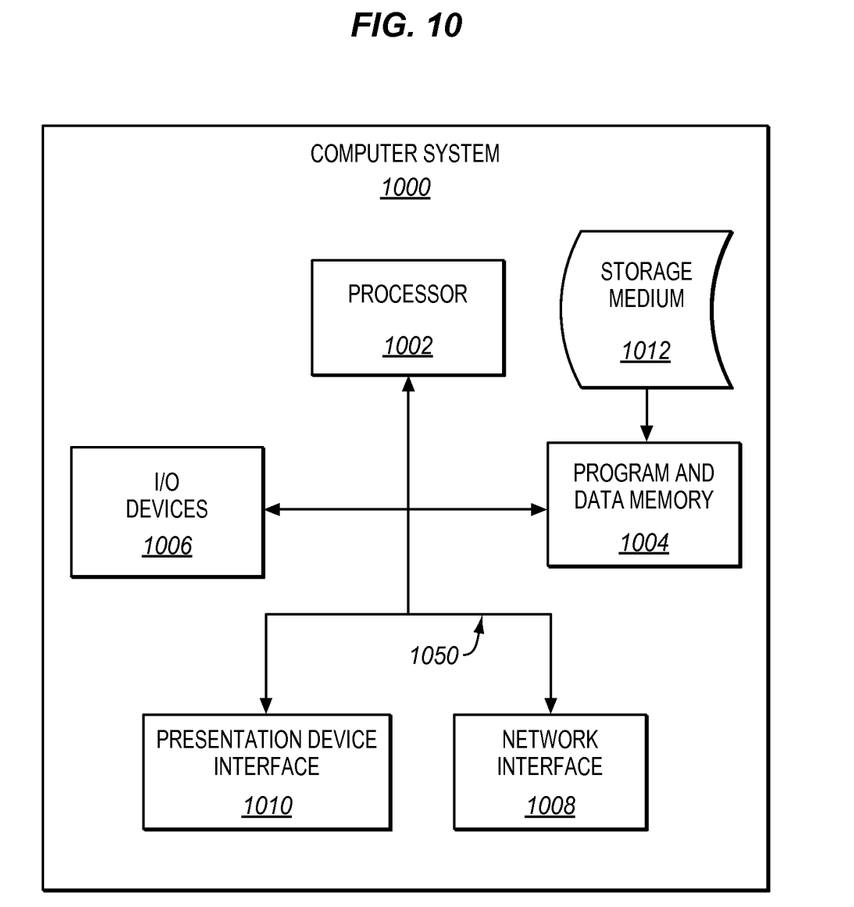
FIG. 10 is a block diagram of an exemplary computing system operable to employ features of the DSM network scanner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 10 is a block diagram depicting a computer system 1000 operable to provide features and aspects hereof by executing programmed instructions and accessing data stored on a computer readable storage medium 1012.

Furthermore, embodiments of the invention can take the form of a computer program accessible via a computer-readable storage medium 1012 providing program code for use by a computer or any other instruction execution system. For the purposes of this description, the storage medium 1012 can be any apparatus that can contain, store, communicate, or transport the program code for use by the computer system 1000. The storage medium 1012 can be an electronic, magnetic, optical, electromagnetic, infrared, or semiconductor (or apparatus or device). Examples of the storage medium 1012 include solid state memory, magnetic tape, a removable computer diskette, a random access memory (RAM), a read-only memory (ROM), a rigid magnetic disk, and an optical disk. Examples of optical disks include compact disk—read only memory (CD-ROM), compact disk—read/write (CD-R/W), and DVD.

The computer system 1000, being suitable for storing and/or executing the program code, includes at least one processor 1002 coupled to memory element 1004 through a system bus 1050. The memory element 1004 can include local memory employed during actual execution of the program code, bulk storage, and cache memories that provide temporary storage of at least some program code and/or data in order to reduce the number of times the code and/or data are retrieved from bulk storage during execution.

Input/output I/O devices 1006 (including but not limited to keyboards, displays, pointing devices, etc) can be coupled to the computer system 1000 either directly or through intervening I/O controllers. Network adapter interfaces 1008 may also be coupled to the computer system 1000 to enable the computer system 1000 to become coupled to other data processing systems or storage devices through intervening private or public networks. Modems, IBM Channel attachments, SCSI, Fibre Channel, and Ethernet cards are just a few of the currently available types of network adapter interfaces. Presentation device interface 1010 may be coupled to the computer system 1000 to interface to one or more presentation devices, such as printing systems and displays, for presentation of data generated by processor 1002.

Although specific embodiments have been described herein, the scope of the invention is not limited to those specific embodiments. Accordingly, the scope of the invention is only defined by the following claims and any equivalents thereof.

We claim:

1. A network scanner operable within a computer network and controllable via post scan processes (PSPs) of a Distributed Scan Management (DSM) protocol, wherein the PSPs include settings that are used to establish scan acquisition and post scan instructions for the network scanner, the network scanner comprising:
   a processor;
   a network interface operable to communicatively couple to the computer network;
   a user interface operable to receive login information associated with a user, wherein the login information is operable to grant access to one or more of the PSPs on the computer network; and
   a storage module operable to store scanner software instructions that, when executed by the processor,
   direct the processor to present the one or more accessed PSPs to the user for selection via the user interface,
   wherein the user interface is further operable to receive override information from the user that is used to override at least one setting of a selected PSP,
   wherein the software instructions further direct the processor to determine whether the override information is supported by the network scanner, to determine whether the selected PSP is valid for the network scanner in response to determining that the override information is supported by the network scanner, and to ignore the selected PSP after determining that the selected PSP is invalid for the network scanner, and
   wherein the storage module is further operable to store the override information in a format that enables subsequent use by the user.

2. The network scanner of claim 1, wherein the software instructions further direct the processor to automatically retrieve the override information upon a subsequent login by the user.

3. The network scanner of claim 1, wherein the network interface is further operable to transfer the override information to the computer network for subsequent use by the user.

4. The network scanner of claim 3, wherein the software instructions further direct the processor to automatically retrieve the override information from the computer network upon a subsequent login by the user.

5. The network scanner of claim 1, wherein the user interface is further operable to receive a search parameter from the user and wherein the software instructions are further operable to direct the processor to locate and retrieve at least one of the PSPs for presentation to the user via the user interface based on the search parameter.

6. The network scanner of claim 5, wherein the search parameter is a scanned image destination, a resolution, a name, an output file format, or a color type for the scanned image.

7. The network scanner of claim 1, wherein the override information is a scanned image destination, a resolution, a name, an output file format, or a color type for the scanned image.

8. The network scanner of claim 1, wherein the software instructions further direct the processor to determine whether a combination of PSP scan settings and user generated scan settings is supported by the network scanner.

9. A method of scanning operable within a computer network via a Distributed Scan Management (DSM) protocol, the method comprising:
   receiving login information from a user via a user interface of a network scanner to authenticate the user;
   retrieving one or more post scan processes (PSPs) associated with the user from the computer network, wherein the PSPs include settings that are used to establish scan acquisition and post scan instructions for a network scanner;
   presenting the one or more retrieved PSPs to the user for selection via the user interface;
   receiving override information from the user via the user interface;
   determining whether the override information is supported by the network scanner;

determining whether a selected PSP is valid for the network scanner in response to determining that the override information is supported by the network scanner;

ignoring the selected PSP after determining that the selected PSP is invalid for the network scanner;

if the selected PSP is valid for the network scanner, overriding at least one setting of the selected PSP based on the override information and scanning according to the at least one overridden setting of the PSP; and storing the override information at the network scanner in a format that enables subsequent use by the user.

10. The method of claim 9, further comprising automatically retrieving the override information upon a subsequent login by the user.

11. The method of claim 9, further comprising transferring the override information to the computer network for storage and subsequent use by the user.

12. The method of claim 11, further comprising automatically retrieving the override information from the computer network upon a subsequent login by the user.

13. The method of claim 9, further comprising receiving a search parameter from the user via the user interface and retrieving at least one of the PSPs for presentation to the user via the user interface based on the search parameter.

14. The method of claim 13, wherein the search parameter is a scanned image destination, a resolution, a name, an output file format, or a color type for the scanned image.

15. The method of claim 9, wherein the override information is a scanned image destination, a resolution, a name, an output file format, or a color type for the scanned image.

16. The method of claim 9, further comprising determining whether a combination of PSP scan settings and user generated scan settings is supported by the network scanner.

17. A non-transitory computer readable medium comprising software instructions that, when executed by a processor of a Distributed Scan Management (DSM) network scanner, direct the processor to:

receive login information from a user via a user interface of the network scanner to authenticate a user;

retrieve one or more post scan processes (PSPs) associated with the user from the computer network, wherein the PSPs include settings that are used to establish scan acquisition and post scan instructions for a network scanner;

present the one or more retrieved PSPs to the user for selection via the user interface;

receive override information from the user via the user interface;

determine whether the override information is supported by the network scanner;

determine whether a selected PSP is valid for the network scanner in response to determining that the override information is supported by the network scanner;

ignore the selected PSP after determining that the selected PSP is invalid for the network scanner;

if the selected PSP is valid for the network scanner, override at least one setting of the selected PSP based on the override information and scan according to the at least one overridden setting of the PSP;

store the override information at the network scanner in a format that enables subsequent use by the user; and automatically retrieve the override information at the network scanner upon a subsequent login by the user.

18. The computer readable medium of claim 17, wherein the software instructions are further operable to direct the processor to:

transfer the override information to the computer network for storage; and automatically retrieve the override information from the computer network upon a subsequent login by the user.

19. The computer readable medium of claim 17, wherein the software instructions are further operable to direct the processor to:

receive a search parameter from the user via the user interface; and retrieve at least one of the PSPs for presentation to the user via the user interface based on the search parameter.

20. The computer readable medium of claim 17, wherein the software instructions are further operable to direct the processor to:

determine whether a combination of PSP scan settings and user generated scan settings is supported by the network scanner.

* * * * *